United States Patent [19]

Kuyel et al.

[11] Patent Number: 4,635,855

[45] Date of Patent: Jan. 13, 1987

[54] METHOD AND APPARATUS FOR RAPIDLY CONTROLLING THE FLOW OF GAS

[75] Inventors: Birol Kuyel, Hopewell Township, Mercer County; Paul F. Sinclair, III, Trenton, both of N.J.

[73] Assignee: AT&T Technologies, Inc., Berkeley Heights, N.J.

[21] Appl. No.: 727,713

[22] Filed: Apr. 26, 1985

[51] Int. Cl.⁴ ............................................. B05B 1/14
[52] U.S. Cl. ............................. 239/551; 251/129.05; 251/129.16; 376/144
[58] Field of Search ............... 376/107, 128, 141, 144, 376/145; 378/119, 122; 239/600, 554, 550, 551, 548, 562, 443, 444, 296, 583; 137/870, 625.33, 601, 607; 251/129.01, 129.05, 129.06

[56] References Cited

U.S. PATENT DOCUMENTS

| | | | |
|---|---|---|---|
| 2,889,237 | 6/1959 | Ball | 239/550 X |
| 3,523,677 | 8/1976 | North | 251/129.16 X |
| 4,223,698 | 9/1980 | Reiniche | 137/870 X |
| 4,247,047 | 1/1981 | Schaming | 239/551 X |
| 4,344,449 | 8/1982 | Meyer | 137/1 |
| 4,494,043 | 1/1985 | Stallings et al. | 376/144 X |
| 4,504,964 | 3/1985 | Cartz et al. | 378/119 |

FOREIGN PATENT DOCUMENTS

| | | |
|---|---|---|
| 4524177 | 5/1966 | Japan . |
| 953476 | 3/1964 | United Kingdom . |
| 128243 | 3/1959 | U.S.S.R. . |
| 657211 | 4/1979 | U.S.S.R. . |

OTHER PUBLICATIONS

"A Fast Gas Valve", A. E. Prinn; *J. Phys. E: Sci. Instrum.*, vol. 11, No. 6 (Jan. 1978).
"Fast Pulsed Gas Valve", C. J. Keyser, M. Dembinski, *Rev. Sci. Instrum.*, 51(4), (Apr. 1980).
The article "A High-Speed Ring Electrodynamic Valve", by B. V. Dauter and L. G. Tokarev, published in *Instruments and Experimental Techniques*, vol. 18, No. 6, Pt. 2 (Nov.-Dec. 1975) at pp. 1888-1890.
NASA Technical Brief 67-10638, published Dec. 1967.

*Primary Examiner*—Joseph F. Peters, Jr.
*Assistant Examiner*—Kevin Patrick Weldon
*Attorney, Agent, or Firm*—R. B. Levy

[57] ABSTRACT

A high speed gas valve (10) comprises an annular base member (14) having a plurality of plenums (18—18) into which a gas is admitted through a passage (42) in an overlying coverplate (16). Within each plenum is a conductive disc (26) which seals an orifice (20) leading from the respective plenum into an annular channel (39) in the top surface of a plate (34) in intimate contact with the bottom of the base member. The channel (39) connects each of a plurality of inclined nozzles (36—36) in the plate to each of the plenums (18—18). Underneath each disc (26) is a portion of an electrode (22). When a time varying voltage is applied to the electrode, a time varying current passes therein causing an eddy current to be induced in each of the discs (26—26) which lifts them simultaneously out of sealing engagement with the respective orifices (20—20). As a result, gas is discharged from the nozzles (36—36) as inclined gas streams (46—46) which form a shell (48).

2 Claims, 4 Drawing Figures

METHOD AND APPARATUS FOR RAPIDLY CONTROLLING THE FLOW OF GAS

TECHNICAL FIELD

This invention relates generally to a method and apparatus for rapidly controlling the flow of gas to produce a uniformly shaped gas shell.

BACKGROUND OF THE INVENTION

High speed valves are commonly employed in applications where the flow of a gas or gases into a vessel, such as a vacuum chamber, must be controlled very rapidly. Although the design details of high speed valves vary, most include a valve member in the form of a disc which is spring-biased to seal an orifice from a plenum into which the gas is admitted. The valve member is usually fabricated from aluminum or a similar material in which an eddy current is induced by passing a time varying current in a planar coil located in proximity therewith to lift the valve member away from the orifice. As long as a time varying current is present in the coil, the valve member continues to be lifted from the orifice to open the valve. An example of a high speed valve of this type is found in British Patent Specification No. 953,476.

Present day high speed gas valves only produce a single stream of gas. In certain applications, there is a need to rapidly control the flow of a gas to produce a plurality of gas streams which form a shell. For example, with certain types of plasma x-ray sources, there is a need to produce a plurality of gas streams to form a gas shell which can be ionized when an electric field is applied axially thereacross. When ionized, the shell is transformed into a sheath of plasma which carries a current axially along its surface.

The current passing in the plasma sheath produces a magnetic field which interacts therewith to produce a radially inwardly directed force which implodes the sheath. Upon implosion, the sheath of plasma becomes very hot and dense, causing electrons therein to move to higher energy levels. The electrons ultimately jump to lower energy levels, causing the plasma to radiate energy in a burst of soft x-rays. An example of a plasma x-ray source which produces x-rays in this fashion is found in copending application Ser. No. 727,470 for "Method and Apparatus for Producing X-ray Pulses" filed on Apr. 26, 1985 in the name of B. Kuyel and assigned to the same assignee. That appplication is herein incorporated by reference.

Accordingly, there is a need for a technique for rapidly controlling the flow of gas to produce a plurality of gas streams which form the outline of a shell.

SUMMARY OF THE INVENTION

A method for rapidly controlling the flow of gas to produce a plurality of gas streams which form a shell comprises the steps of: directing a gas into each of a plurality of passages, each having an opening therein leading into at least one of a plurality of nozzles in spaced relationship with each other; releasably sealing the opening leading from each passage with a respective one of a plurality of conductive discs; and rapidly lifting the discs simultaneously from the openings to allow gas to pass into the nozzles and be discharged therefrom as a plurality of gas streams which form the outline of a shell.

DETAILED DESCRIPTION

Figure 1:
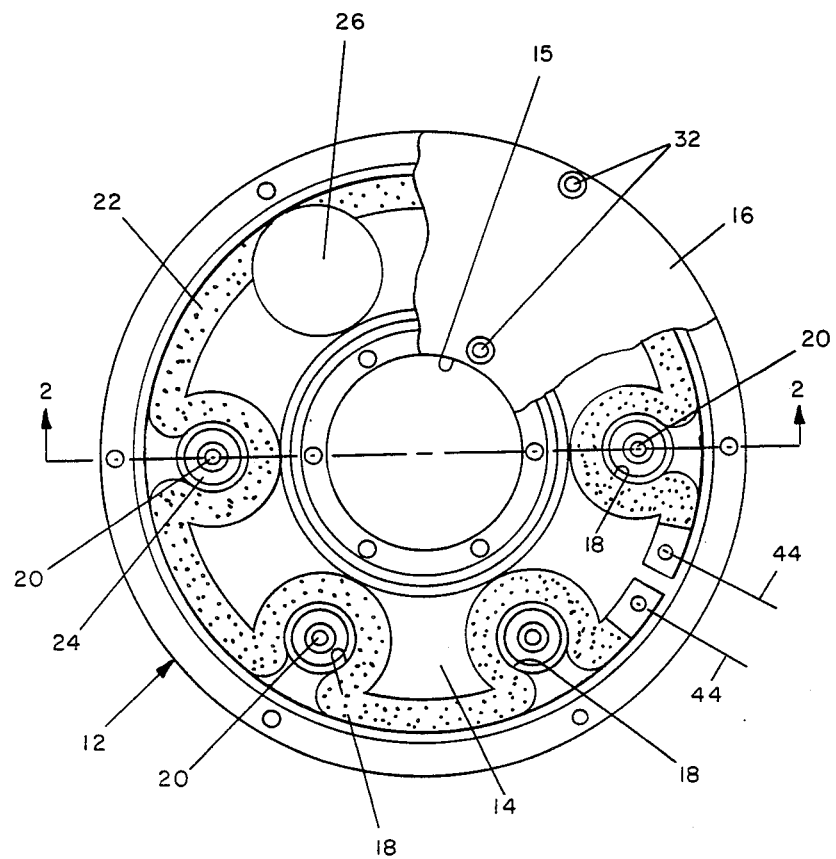
FIG. 1 is a partially cut away plan view of a gas valve constructed in accordance with the teachings of the present invention.
Figure 2:
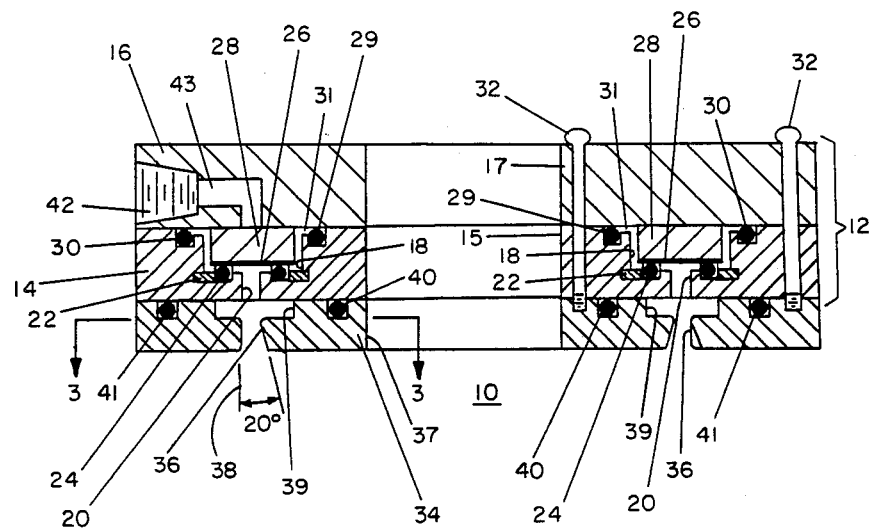
FIG. 2 is a cross-sectional side view in elevation of the valve of FIG. 1 taken along the plane 2—2 of that figure.

FIGS. 1 and 2 are a cut away plan view and a cross-sectional side view in elevation, respectively, of a high speed gas valve 10 constructed in accordance with the teaching of the present invention. The valve 10 comprises a housing 12 formed of an annular base member 14 having a centrally located bore 15 therethrough and a coverplate 16 having a bore 17 therethrough in communication with the bore 15. The base member 14 is typically formed of nonconductive material, e.g., plastic or the like, and has a plurality of annular plenums 18—18 therein, which are typically, although not necessarily, spaced equally distant from each other. In an exemplary embodiment, there are six plenums 18—18 in the base member 14 although a larger or smaller number may be provided, depending on the radius of the base member as well as the size of the bore 15 therethrough and the diameter of each plenum. Each plenum 18 is in communication with an orifice 20 typically 0.125" in diameter provided through the bottom of the base member 14.

Passing through each plenum 18 is a portion of an electrode 22, which takes the form of a planar stamped copper loop capable of carrying a very large current typically 50 KA for short periods of time. Within the plenum 18, the portion of the electrode 22 passing therethrough substantially circumscribes the orifice 20. An O ring 24 is seated about each orifice 20 so as to be within the portion of the electrode 22 passing through each plenum 18. Lying above each O ring 24 is a disc 26 which seals the opening between the orifice 20 and the plenum 18 when the disc contacts the O ring. In practice, each disc 26 takes the form of a circular aluminum plate.

Referring to FIG. 2, above the disc 26 is an annular resilient member 28, typically taking the form of a sponge made from open pore polyurethane foam or the like. The sponges 28—28 are each urged against a separate one of the underlying discs 26—26, respectively, by the coverplate 16 which is typically made from plastic or the like. An inner and outer O ring 29 and 30, concentric with each other, are provided between the coverplate 16 and the base member 14 so as to lie on opposite sides of each of the plenums 18—18 to seal the opening between the coverplate and the base member. In practice, when coverplate 16 overlies the base member 14 so as to compress each of the O rings 29 and 30, a void or recess 31 is present between the top of the wall of each plenum 18 and the coverplate so that the plenums are in fluid communication with each other.

As best shown in FIG. 2, each of a plurality of screws 32—32 extends through the coverplate 16 and the base member 14 to threadedly engage a plate 34 in intimate contact with the bottom of the base member. The plate 34 has a plurality of nozzles 36—36 extending therethrough. The nozzles 36—36 are spaced equally distant from each other about a bore 37 through the plate 34 in communication with the bores 15 and 17 through the base member 14 and the coverplate 16, respectively. Each nozzle 36 is convergent and divergent in form and inclined at a small angle, typically 20° with a line 38 normal to the plane of the plate 34. Also, each nozzle is inclined at a small angle typically 20° with respect to the plane of the drawing.

Figure 3:
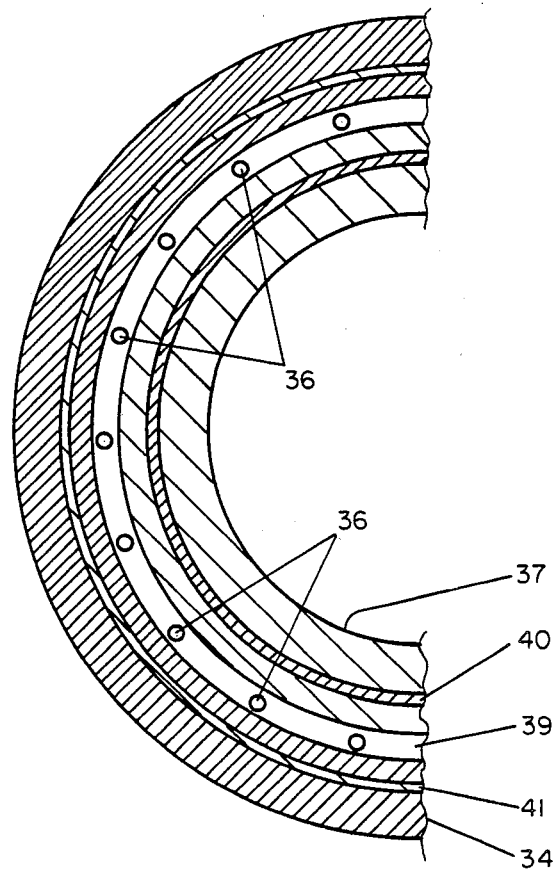
FIG. 3 is a cross-sectional plan view of the valve of FIG. 2 taken along the plane 3—3 thereof.

Referring to FIGS. 2 and 3, an annular channel 39 is provided in the top surface of plate 34 in communication with each of the nozzles 36—36. As shown in FIG. 2, when the base member 14 is secured by screws 32—32 in intimate contact with the plate 34, the channel 39 serves as a plenum to connect each of nozzles 36—36 to each of the orifices 20—20 (FIG. 2). An inner and outer O ring 40 and 41, concentric with each other, are interposed between the plate 34 and the base member 14 so as to lie on opposite sides of the channel 39 to seal the opening between the plate and the base member. In practice, the plate 34 may take the form of the top wall of a tubular electrode of the type employed in the plasma source disclosed in the aforementioned copending Kuyel patent application (Ser. No. 727,470).

In operation, a gas such as argon, is admitted into the coverplate 16 through an opening 42 therein and is conducted by a passageway 43 into the recess 31 so as to pass into each of the plenums 18—18 in the base member 14 so as to be presented to each of the discs 26—26. For so long as each disc 26 is biased against the underlying O ring 24, no gas passes into channel 39 in the plate 34 and out through the nozzles 36—36. Accordingly, at this time the valve 10 is closed.

To open the valve 10, a time varying voltage is applied to the electrode 22, by discharging a capacitor bank (not shown) typically 30 F and charged to typically 10 kV, across leads 44—44 of FIG. 1 which are each coupled to opposite ends of the electrode. The time varying voltage causes a time varying current to pass in the electrode 22 which, in turn, causes an eddy current to be induced in each of the discs 26—26. The eddy current induced in each disc 26 produces a magnetic field whose lines of force (not shown) are opposite to the lines of force of the magnetic field (not shown) produced by the current passing in the electrode 22.

The opposing lines of magnetic force cause each disc 26 to be rapidly lifted, typically about $3\mu$ sec., from the corresponding O ring 24 therebeneath to open the valve 10. As the discs 26—26 are lifted from the corresponding O rings 24—24, the sponges 28—28 restrain the discs to reduce the vibration thereof. After the current in the electrode 22 decays, the spring force of the sponge 28, together with the pressure of the gas against the disc 26, return the disc back into seating engagement with the O ring 24 therebeneath to close the valve 10.

Figure 4:
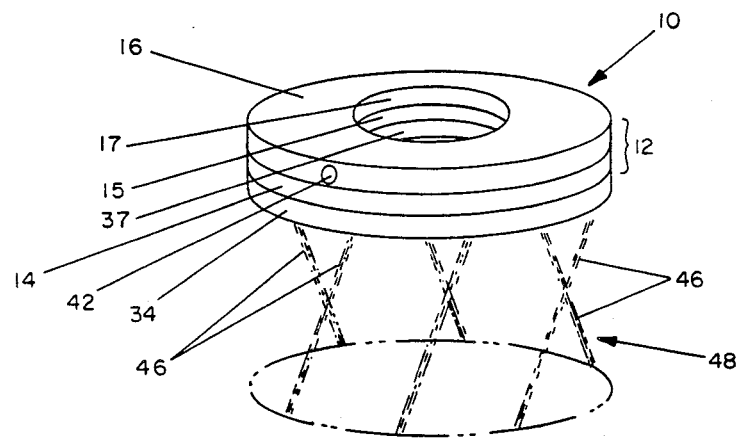
FIG. 4 is a perspective view of the gas valve of FIGS. 1-3 showing a shell formed by gas streams discharged therefrom.

While each disc 26 is lifted from the respective O ring 24 therebeneath, gas enters the channel 39 and passes therefrom through each nozzle 36. Gas is discharged from each nozzle 36 in a downwardly inclined stream 46 as shown in FIG. 4. Since the nozzles 36—36 are spaced equally distant about the bore 37 through the plate 34, the downwardly directed streams 46—46 are spaced likewise and thus form the outline of a frusto-conical shell 48, as illustrated in FIG. 4.

In practice, each of the nozzles 36—36 is designed to produce Mach 6 flow so that when the gas pressure in the plenums 18—18 is 2 atmospheres, approximately $10^{17}$ argon atoms/atmosphere leave each nozzle within approximately 50 microseconds. By adjusting the pressure of the gas against each disc 26 and the magnitude of the voltage applied to the electrode 22, the lifting force on each disc can be varied to control the mass of gas leaving each nozzle 36 in a given time.

Typically, the environment in which valve 10 operates is kept at a vacuum. Thus, when gas is admitted into the valve at a pressure of 2 atmospheres, the streams 46—46 leave the valve 10 at a supersonic velocity because of the pressure difference. The rapid opening of the valve 10 assures that the pressure of gas behind each nozzle 36 reaches 2 atmospheres pressure very quickly to establish the pressure difference which creates the supersonic velocity. As a result of their supersonic velocity, the gas streams 46—46 become very cool. Making each stream 46 cool causes it to remain collimated which is very desirable keeping the width of the shell 48 very narrow.

The gas valve 10 provides a very short path for gas traveling therethrough because the overall length of each plenum 18 and each orifice 20 is very small, typically less than 2 cm. The very short path of gas traveling through the valve 10 renders it very desirable for use in the plasma x-ray source (not shown) described in the aforementioned copending Kuyel patent application. Because of the short length of gas travel through the valve 10, the shell 48 produced thereby becomes well defined within a very short time. As a consequence, the application of an electric field to the shell 48 to transform it into an x-ray radiating plasma, can be timed very accurately to coincide with the formation of the shell. If there is a long delay between formation of the shell 48 and the application of an electric field thereto, then the streams 46—46 will likely diffuse. As a result, the shell 48 will radially diffuse. As the radially diffused shell 48 is subjected to an intense electric field, the resultant plasma which is produced will collapse weakly, reducing the intensity of the x-ray radiation produced thereby.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. Apparatus for rapidly controlling the flow of gas to produce a plurality of gas streams which form the outline of a shell comprising:

an annular base member having a plurality of spaced plenums therein, each plenum communicating with an orifice through the bottom of the base member;

a plate in intimate contact with the bottom of said base member, said plate having an annular channel therein connecting the orifices in said base member to each of a plurality of inclined nozzles passing through said plate;

sealing means, including a conductive disc, disposed within each plenum in said base member for sealing the orifice;

a coverplate overlying the base member, said coverplate having a passageway therein for admitting gas into each of said plenums in said base member; and means within each plenum in said base member for rapidly lifting each of said discs simultaneously from their respective orifices to allow gas to pass into the nozzles and be discharged therefrom as inclined gas streams which form a shell.

2. The invention according to claim 1 wherein means for lifting the discs comprises an electrode having a portion thereof passing through each plenum in said base member beneath each disc to carry a large time varying current which induces an eddy current in each disc to rapidly repel the discs simultaneously out of sealing engagement with the respective orifices.

* * * * *